(12) United States Patent
Park (10) Patent No.: US 6,624,615 B1
(45) Date of Patent: Sep. 23, 2003

(54) BATTERY TEMPERATURE MANAGEMENT METHOD OF AN ELECTRIC VEHICLE

(75) Inventor: Sun-Soon Park, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,235

(22) Filed: Dec. 30, 2002

(30) Foreign Application Priority Data

Aug. 23, 2002 (KR) ..................................... 2002-0050044

(51) Int. Cl.[7] ................................................... H02J 7/16
(52) U.S. Cl. ...................................................... 320/150
(58) Field of Search ................................ 320/104, 150, 320/132, 153; 701/22, 53, 54, 55; 180/65.2, 65.3, 65.4; 374/107, 141, 135

(56) References Cited

U.S. PATENT DOCUMENTS 6,362,598 B2 * 3/2002 Laig-Horstebrock et al. ........................... 320/132
6,430,483 B2 * 8/2002 Takaoka et al. .............. 701/22

* cited by examiner

Primary Examiner—Edward H. Tso
Assistant Examiner—Pia Tibbits
(74) Attorney, Agent, or Firm—Pennie & Edmonds LLP

(57) ABSTRACT

A method for managing temperature of a battery of an electric vehicle is provided which comprises: determining whether a value of a state of charge of a battery is less than a predetermined value; regulating temperature of the battery such that the temperature of the battery approaches a temperature for a maximum charge power of the battery, if the value of the state of charge of the battery is less than the predetermined value; and regulating temperature of the battery such that the temperature of the battery approaches a temperature for a maximum charge amount of the battery, if the value of the state of charge of the battery is greater than the predetermined value.

17 Claims, 6 Drawing Sheets

BATTERY TEMPERATURE MANAGEMENT METHOD OF AN ELECTRIC VEHICLE

FIELD OF THE INVENTION

The present invention relates to an electric vehicle, and more particularly, to a battery temperature management method of an electric vehicle capable of decreasing charge time and obtaining a maximum charge amount (Ah) during fast charging by active control of the temperature of the battery.

BACKGROUND OF THE INVENTION

Generally, the battery that provides the main power to an electric vehicle is one of the most important components that determines the quality of the vehicle. Thus, a typical electric vehicle is equipped with a battery management system ("BMS") that manages all of the states of the battery by monitoring battery states. The BMS also provides information to an upper controller on the charging/discharging current limitation values of the battery based on the temperature of the battery, the surrounding temperature, and the charging state, thereby optimizing use of the electric vehicle.

The temperature of the battery is increased by chemical reactions, and this causes the ratio of charging capacity to rating capacity of the battery to be reduced. Also, when the battery is charged at an improper temperature, the battery can be damaged due to over-charging, and the vehicle's mileage can be reduced due to low-capacity charging. Further, at low temperatures, fast charging cannot be performed since the charge power may be especially low from reduced charging capacity.

Thus, in an electric vehicle, it is very important to maintain the battery at an optimal temperature to be able to charge the battery to its maximum amount, and to control the temperature of the battery so that charging at high power levels is possible.

Figure 1:
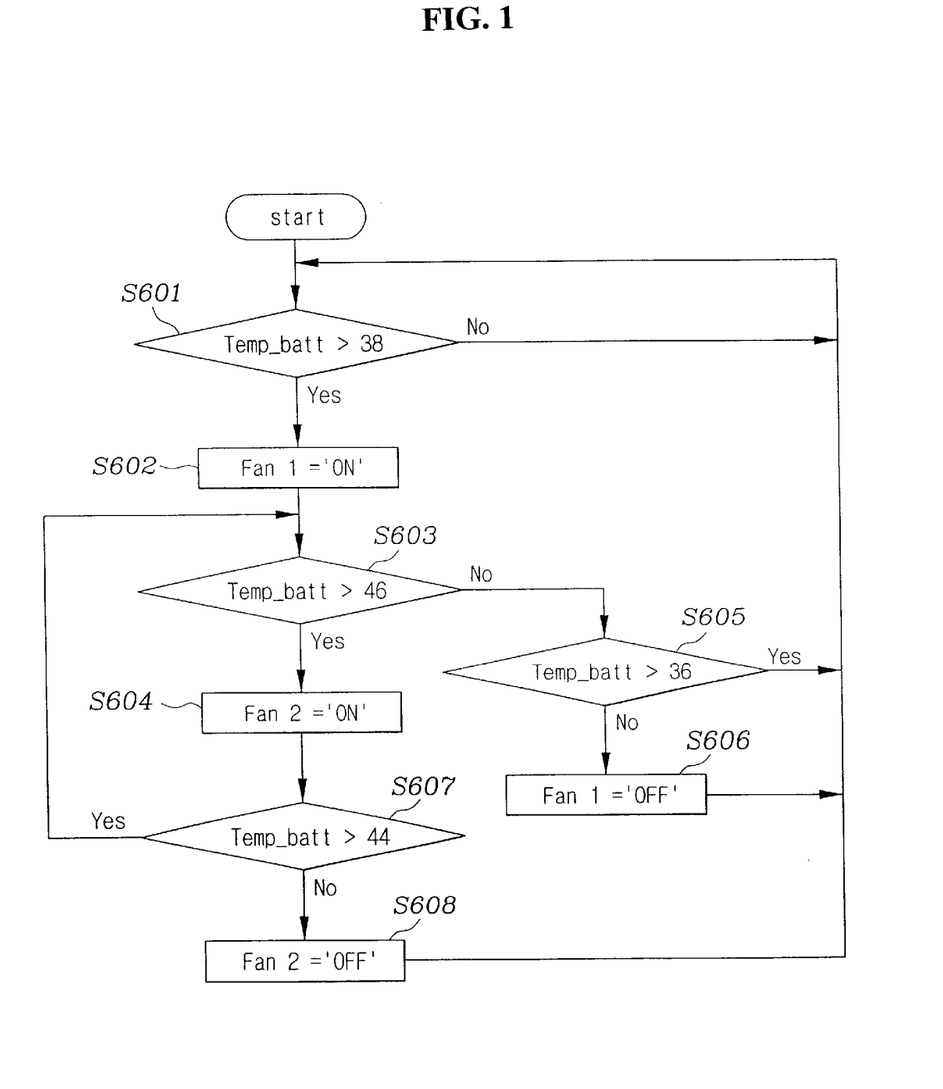
FIG. 1 is a flow chart of a battery temperature management technique in a conventional electric vehicle.

FIG. 1 shows a conventional battery temperature management method. When the battery is being charged in a conventional electric vehicle, the BMS determines whether a detected temperature is higher than 38 degrees (S601). When the temperature of the battery is determined to be lower than 38 degrees, the current state is maintained, and when the temperature is determined to be higher than 38 degrees, a battery-cooling fan is turned on in a first stage to perform cooling of the battery (S602). When the first stage of battery cooling is enabled, the BMS determines whether the temperature of the battery is higher than 46 degrees (S603).

If the temperature of the battery is determined to be higher than 46 degrees, the second stage of the cooling fan is enabled to accelerate cooling of the battery (S604). When the temperature is determined to be lower than 46 degrees, the BMS next determines whether the battery temperature is higher than 36 degrees (S605). If the battery temperature is determined to be higher than 36 degrees, driving of the cooling fan is maintained in the first stage, and when the battery temperature is determined to be lower than 36 degrees, the cooling fan is stopped (S606).

When the cooling fan is operated in the second stage to cool the battery, the BMS determines whether the battery temperature is higher than 44 degrees (S607). If the battery temperature is determined to be higher than 44 degrees, the procedure returns to step S603, and when the battery temperature is determined to be lower than 44 degrees, the second stage operation of the cooling fan is turned off (S608) and the procedure returns to step S601.

Figure 2:
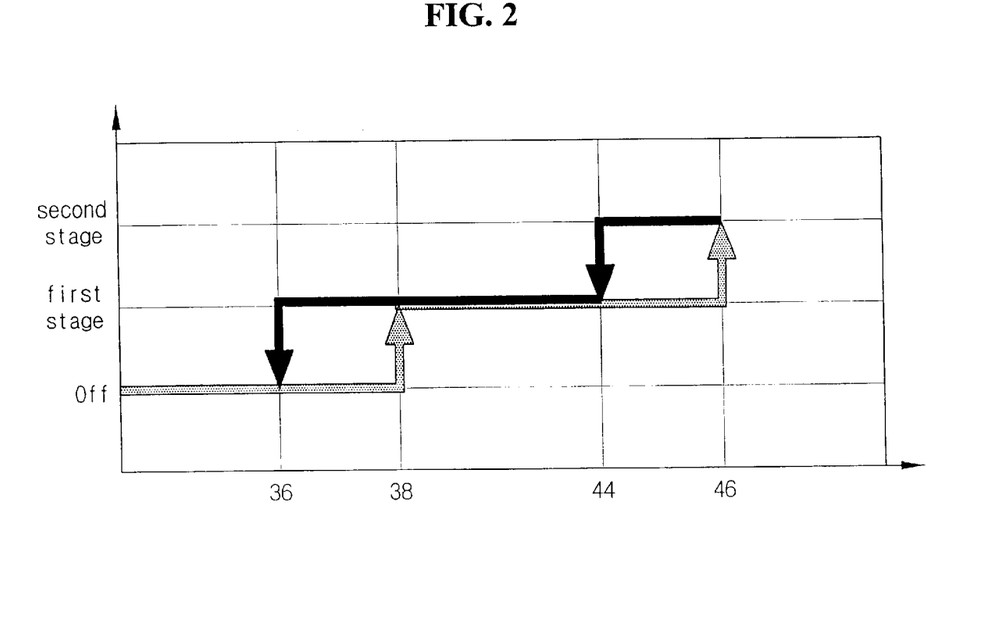
FIG. 2 is a view showing a working relationship of the battery temperature and a cooling fan in the battery temperature management technique of a conventional electric vehicle in accordance with FIG. 1.

The aforementioned battery temperature management method, which is summarized in FIG. 2, has several disadvantages. For example, the cooling fan is only used when the temperature of the battery is increased, and the cooling fan is not operated until the temperature of the battery increases to a predetermined temperature, so fast charging is not ordinarily performed. In addition, since the battery is maximally cooled to an external temperature, the battery can be damaged and vehicle mileage can be reduced due to undercharging or overcharging in a hot area or in a cold area. In particular, in a cold area, this method may limit the maximum charging power.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention, the method for managing temperature of a battery of an electric vehicle comprises: determining whether a battery charge mode is a fast-charging mode based on state information of the battery; determining whether a value of a state of charge (SOC) is lower than a predetermined SOC value, when the battery charge mode is the fast-charging mode; detecting a temperature of the battery and comparing the detected temperature with a reference value for each stage therewith, when the value of SOC is lower than the predetermined SOC value; and regulating the temperature of the battery by controlling power output of a heater in response to a result of comparing the battery temperature with the reference value for each stage.

The method for managing temperature of a battery also comprises: detecting a temperature of the battery and comparing a difference between the detected temperature of the battery and a predetermined value with the reference temperature for each stage, when the current SOC value is determined to be less than the reference SOC value; and regulating the temperature of the battery by driving a cooling fan in response to a result of comparing the difference between the detected temperature of the battery and the predetermined value with the reference value for each stage at a final state of charging.

Preferably, the reference SOC value is set in a range of approximately 80~90%. Also, preferably, the temperature of the battery for beginning to drive a cooling fan of the temperature control system is set at approximately 40 degrees. Further, it is preferable that the power output of the heater for increasing the temperature of the battery is increased as the temperature of the battery is decreased. The preferable range of the temperature of the battery for adjusting the power output of the heater is set in intervals of approximately 10 degrees.

It is also preferable that the driving strength of the cooling fan according to the temperature of the battery at the final state of charging is adjusted for each stage. The preferable range of the temperature of the battery for driving control of the cooling fan at the final state of charging is set in intervals of approximately 10 degrees. Preferably, the adjustment of the driving of the cooling fan and the power output of the heater of the temperature control system is varied according to characteristics of the battery.

In another preferred embodiment of the present invention, a method for managing temperature of a battery of a electric vehicle comprises: determining whether a value of a state of charge of a battery is less than a predetermined value; regulating temperature of the battery such that the temperature of the battery approaches a temperature for a maximum charge power of the battery, if the value of the state of charge of the battery is less than the predetermined value; and regulating temperature of the battery such that the temperature of the battery approaches a temperature for a maximum charge amount of the battery, if the value of the state of charge of the battery is greater than the predetermined value.

Preferably, if the value of the state of charge of the battery is less than the predetermined value, the step of regulating temperature of the battery comprises: determining whether the battery temperature is higher than a first predetermined temperature; determining whether the battery temperature is higher than a second predetermined temperature, if the battery temperature is higher than the first predetermined temperature; and decreasing the battery temperature such that the battery temperature approaches the temperature for the maximum charge power of the battery by cooling the battery, if the battery temperature is higher than the second predetermined temperature.

It is also preferable that, if the value of the state of charge of the battery is less than the predetermined value, the step of regulating temperature of the battery further comprises: increasing the battery temperature such that the battery temperature approaches the temperature for the maximum charge power by heating the battery, if the battery temperature is not higher than the first predetermined temperature.

It is further preferable that if the if the value of the state of charge of the battery is greater than the predetermined value, the step of regulating temperature of the battery comprises: determining whether a difference between the battery temperature and a predetermined temperature is less than a predetermined value; and decreasing the battery temperature such that the battery temperature approaches the temperature for the maximum charge amount in response to the difference between the battery temperature and the predetermined temperature, if the difference is not less than the predetermined value.

In yet another preferred embodiment of the present invention, a battery temperature management system comprises a battery temperature control apparatus and a battery control unit. The battery temperature control apparatus includes a battery heating unit and a battery cooling unit.

The battery control unit is coupled to the battery temperature control apparatus to control temperature of the battery, and it is programmed to perform a battery temperature control method comprising: determining whether a value of a state of charge of the battery is less than a predetermined value; regulating temperature of the battery such that the temperature of the battery approaches a temperature for a maximum charge power of the battery, if the value of the state of charge of the battery is less than the predetermined value; and regulating temperature of the battery such that the temperature of the battery approaches a temperature for a maximum charge amount of the battery, if the value of the state of charge of the battery is not less than the predetermined value.

Another preferred embodiment of the present invention is a method for managing temperature of a battery of an electric vehicle comprising: determining whether a value of a state of charge (SOC) is lower than a predetermined SOC value; and detecting a temperature of the battery. When the value of the SOC is lower than the predetermined SOC value, the method comprises comparing the detected temperature with a plurality of reference values, each reference value corresponding to a boundary of a plurality of battery temperature states, and each battery temperature state corresponding to a stage of a battery heater; and regulating the temperature of the battery by controlling the battery heater in accordance with the stage of the battery heater corresponding to a result of comparing the detected temperature of the battery with the reference value.

Also, when the value of the SOC is greater than the predetermined SOC value, the method comprises: comparing a difference between the detected temperature of the battery and a predetermined value with a plurality of reference temperatures, each reference temperature corresponding to a boundary of a plurality of battery temperature states, and each battery temperature state corresponding to a stage of a battery cooling fan; and regulating the temperature of the battery by driving the cooling fan in accordance with the stage of the cooling fan corresponding to a result of comparing the difference between the detected temperature of the battery and the predetermined value with the reference value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings.

DETAILED DESCRIPTION OF PREFERRED EMBODIMENTS

The present invention will now be described more fully with reference to the accompanying drawings, in which preferred embodiments of the inventions invention are shown. This invention may, however, be embodied in many different forms, and should not be construed as being limited to the embodiments set forth herein.

Figure 3:
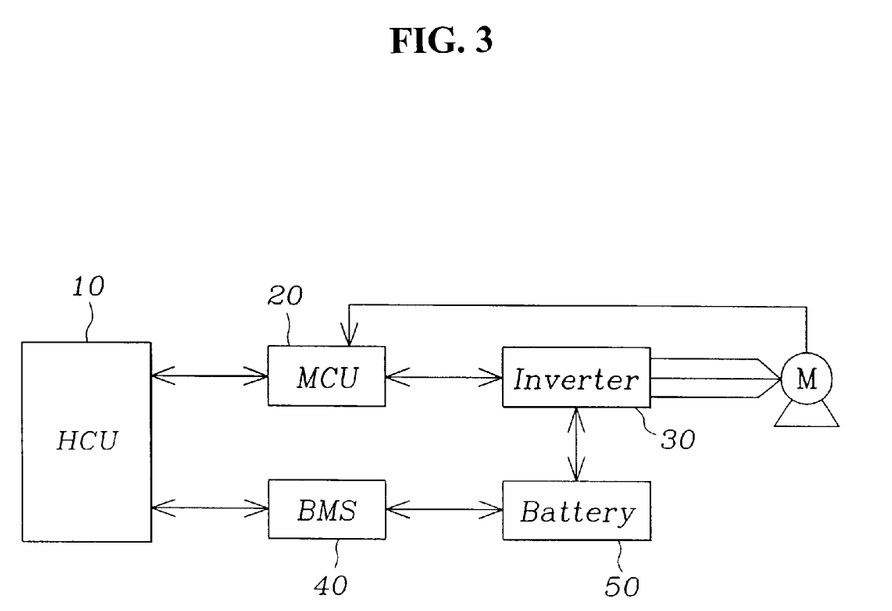
FIG. 3 is a schematic of an electric vehicle in which the battery temperature management techniques of preferred embodiments of the present invention may be used.

As shown in FIG. 3, an electric vehicle according to embodiments of the present invention may include a Hybrid Control Unit 10 ("HCU"), a Motor Control Unit 20 ("MCU"), an inverter 30, and a BMS 40. The HCU 40 controls driving of the vehicle by controlling all of the controllers of the respective components equipped in a hybrid electric vehicle. The MCU 20 outputs a torque control signal and a speed control signal according to a signal from the HCU 10, enabling motor 60 to generate maximum driving force and causing electricity to be generated during braking. The control signals also ensure that the battery 50 is kept in a proper condition. The HCU 40 and the MCU 20 may comprise a processor, a memory, and other necessary hardware and software components as will be understood by persons skilled in the art, to permit the control unit to communicate with sensors and execute the control function as described herein.

The inverter 30 switches an IGBT by PWM (pulse width modulation) control, under control of the MCU 20, to convert a DC voltage of the battery 50 into a three-phase voltage, thereby making it available to the motor 60. The BMS 40 detects current, voltage, and temperature in the operating range of the battery 50 to manage a charging state.

In an electric vehicle, the battery is a power source, and it generates a maximum rating capacity Ah at a temperature of about 25 degrees. The battery's temperature increases during charging, but the battery is capable of obtaining maximum charge power at higher than 40 degrees.

Figure 4:
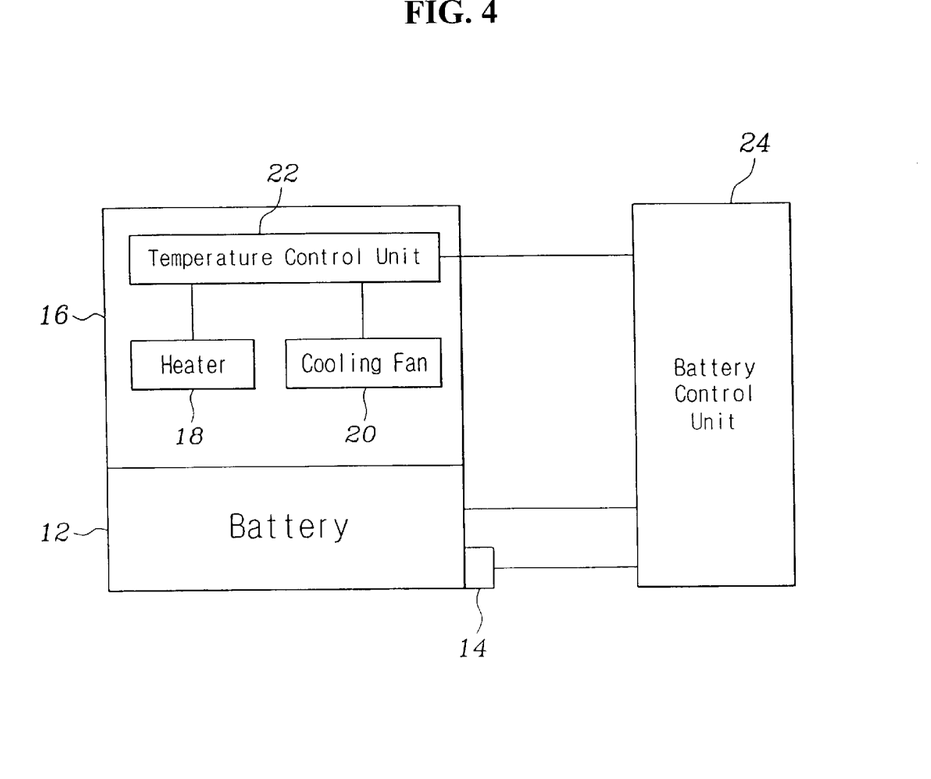
FIG. 4 is a block diagram showing a battery management device capable of applying the battery temperature management techniques according to preferred embodiments of the present invention.

Referring to FIG. 4, a battery management system in accordance with the battery temperature management method of a preferred embodiment of the present invention is shown. Note that, while preferred embodiments of the method of the present invention may be implemented by the particular configuration shown in FIG. 4, one skilled in the art will appreciate that a multitude of different configurations can also be used.

The battery management system includes a battery 12, a battery temperature detector 14, a temperature control apparatus 16, and a battery control unit 24. The battery temperature detector 14 detects temperature of the battery 12 and transmits a corresponding signal to the battery control unit 24. The battery control unit 24 includes a microprocessor, memories, and related hardware and software, and it is preferably programmed for performing the battery temperature management method as described below.

The temperature control apparatus 16 includes a heater 18, a cooling fan, and a temperature control unit 22. The heater 18 is an apparatus for heating the battery. The cooling fan 22 is an apparatus for cooling the battery. The temperature control unit 22 receives a control signal from the battery control unit 24 to control the heater 18 and the cooling fan 20.

Figure 5:
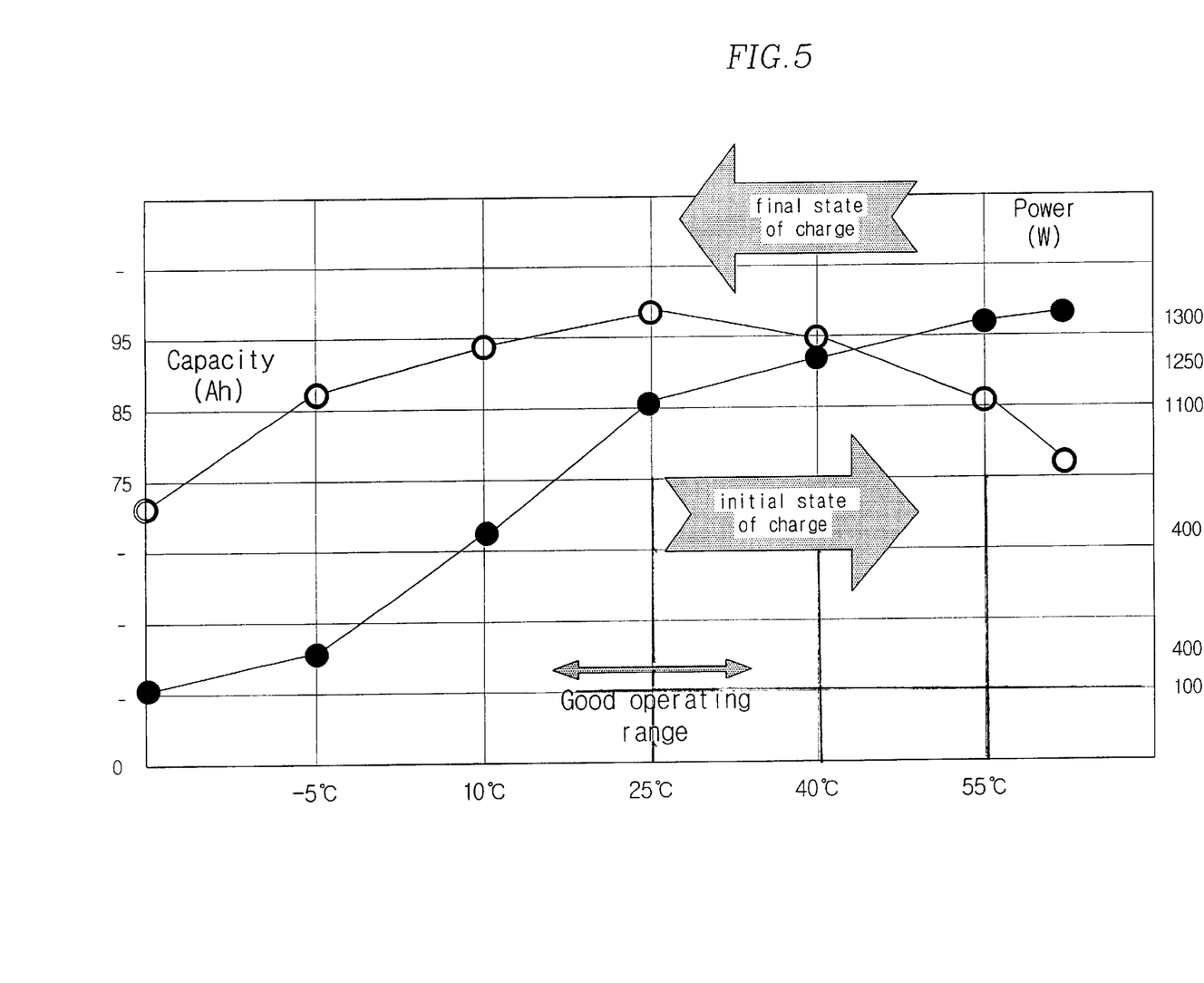
FIG. 5 is a view showing charging capacity according to battery temperature in battery temperature management of an electric vehicle, in accordance with a preferred embodiment.

FIG. 5 is a graph showing variations of the rating capacity (Ah) and the charge power (W) of a battery in relation to the temperature of the battery. As shown, the rating capacity Ah becomes a maximum value when the temperature of the battery is about 25 degrees, and the charge power W becomes a maximum value at higher than 40 degrees (preferably at about 45 degrees). Based on these characteristics, the battery temperature management method according to a preferred embodiment of the present invention decreases charge time by maintaining the temperature of the battery at a temperature capable of obtaining maximum charge power during the initial charging state. Also, the battery temperature management method charges the battery at a maximum charge rate by maintaining the temperature of the battery at a temperature capable of obtaining a maximum charge amount during the final charging state.

Figure 6:
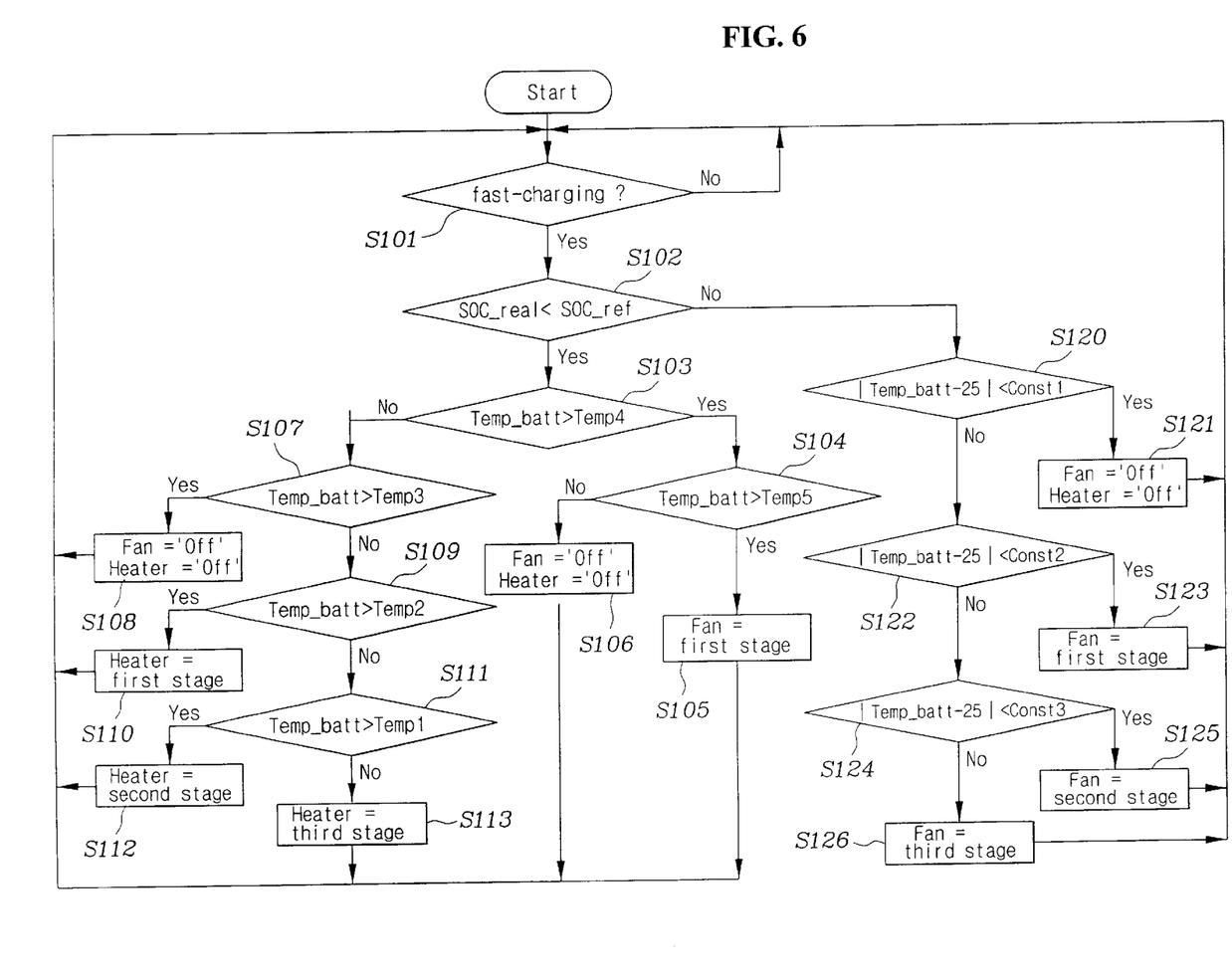
FIG. 6 is a flow chart of a preferred embodiment of performing battery temperature management of an electric vehicle, according to a preferred embodiment of the present invention.

Referring to FIG. 6, battery control unit 24 first determines whether the current mode is a fast-charging mode in all states of the battery being monitored by the BMS (S101). The fast-charging mode refers to charging the battery with a larger charging current than a normal charging mode. When the battery is charged in the fast-charging mode, the charge time can be decreased, but, problematically, the internal temperature of the battery can also rapidly increase. The battery temperature management method according to a preferred embodiment of the present invention is preferably applied in the fast-charging mode, but it is not limited to this mode.

When the battery is determined to be in the fast-charging mode, the battery control unit 24 next determines whether the current value of a state of charge SOC_real is lower than a predetermined reference value of a state of charge SOC_ref (S102). The SOC_ref value may be any value in a range of 80~90%, for example. The battery control unit 24 calculates the state of charge of the battery based on the terminal voltages of the battery, charging current, and internal resistance of the battery. The calculation of the value of a state of charge is well-known in the art, and thus no detailed description is provided herein.

If SOC_real is determined to be lower than SOC_ref, the battery is determined to be an initial charging state, and the battery control unit 24 controls the cooling fan 20 and the heater 18 so that the temperature of the battery is in a range capable of obtaining a maximum charge power, as will be explained in further detail in the following steps. First, when SOC_real is determined to be lower than SOC_ref, the battery control unit determines if the temperature of the battery is higher than a fourth reference value, Temp4 (S103). An example of the fourth reference value is 40 degrees.

Figure 7:
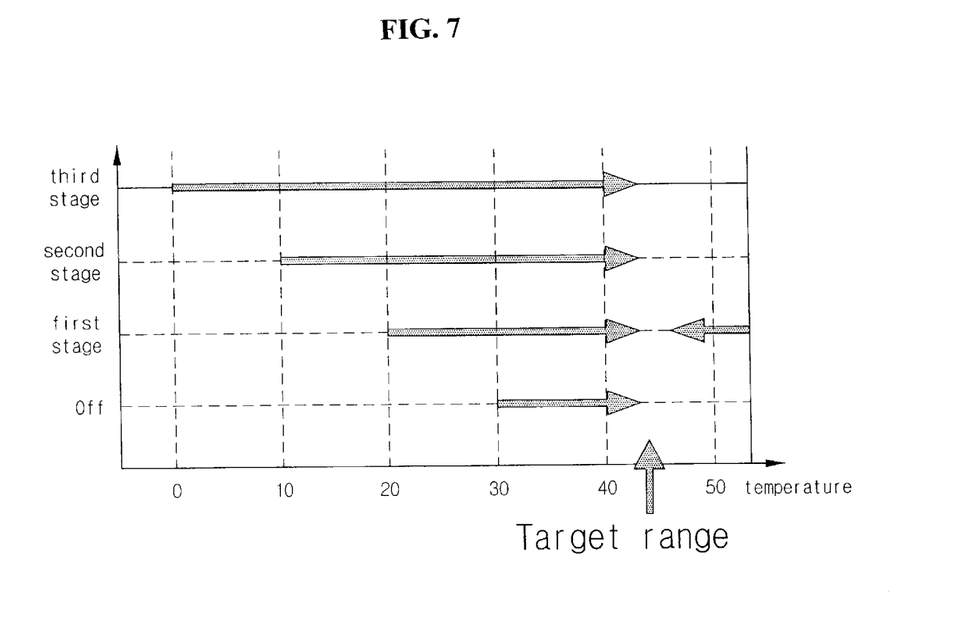
FIG. 7 is a view showing a working relationship of battery temperature and a heater at the initial charging state in battery temperature management of an electric vehicle, based on a preferred embodiment of the present invention.

If the temperature of the battery is determined to be higher than the fourth reference value, the battery control unit 24 then determines if the temperature of the battery is higher than a fifth reference value, Temp5 (S104). An example of the fifth reference value is 50 degrees. If the battery control unit determines that the battery temperature is higher than the fifth reference value, the battery temperature is determined to be at a higher temperature than the target temperature (e.g., 45 degrees) for keeping the battery in an optimal operation state. (Examples of optimal operation states are shown in FIG. 7). In this event, the cooling fan is driven in a first stage to cool the battery, thereby preventing an increase in the temperature of the battery (S105).

In contrast, when the temperature of the battery is determined to be lower than the fifth reference value, the current temperature of the battery is determined to be at a temperature range of an optimal operation state (as shown in FIG. 7). Thus, the cooling fan and the heater in the temperature control system are maintained in an off-state (S106).

Referring back to step S103, when the temperature of the battery is determined to be lower than the fourth reference value, the battery control unit 24 then determines if the battery temperature is higher than the third reference value, Temp3 (S107). An example of a third reference value is 30 degrees. If the temperature of the battery is determined to be higher than the third reference value, the battery temperature is determined to be maintained in a stable operation state (as shown in FIG. 7). Thus, the cooling fan and the heater in the temperature control system are maintained in an off-state (S108).

However, when the temperature of the battery is determined to be lower than the third reference value, the battery control unit 24 then determines if the battery temperature is higher than the second reference temperature, Temp2 (S109). An example of the second reference value is 20 degrees. If the temperature of the battery is determined to be higher than the second reference value, the battery temperature is determined not to be in a stable operation state, but to be close to a stable operation state (shown in FIG. 7). Thus, the heater in the temperature control system is driven in a first stage (S110).

On the other hand, when the temperature of the battery is determined to be lower than the second reference value, the battery control unit 24 then determines if the battery temperature is higher than the first reference value, Temp1 (S111). An example of the first reference value is 10 degrees. If the temperature of the battery is determined to be higher than the first reference value, the heater is driven in a second stage for activating the battery in a low temperature state in a stable manner (S112). If the battery temperature is determined to be lower than the first reference value, the battery is determined to be at a very low temperature (as can be seen in FIG. 7), and therefore the heater is driven in a third stage to increase the battery temperature (S113).

Thus, in this manner, the temperature of the battery for initial charging during a fast-charging mode is controlled.

Meanwhile, back at step S102, when SOC_real is higher than SOC_ref, the battery is determined to be in a final state of charging. As will be explained in the following steps, the cooling fan and the heater are controlled so that the temperature of the battery approaches a temperature capable of obtaining a maximum charge amount.

Figure 8:
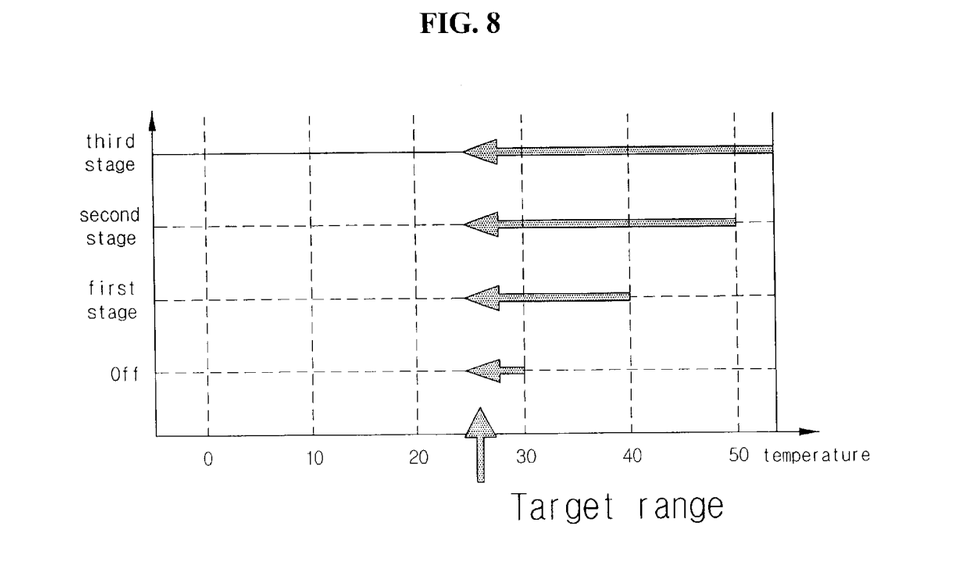
FIG. 8 is a view showing a working relationship of battery temperature and a cooling fan during the final charging state in battery temperature management of an electric vehicle according to a preferred embodiment of the present invention.

When SOC_real is higher than SOC_ref, the battery control unit 24 determines whether the difference between the temperature of the battery and a constant value (e.g., 25) is less than a first temperature value, Const1 (S120). An example of the first temperature value may be 5 degrees. If the difference is determined to be less than 5 degrees, the battery temperature is determined to be in a stable state (Examples of optimal operation states are shown in FIG. 8). Thus, the cooling fan and the heater in the temperature control system are maintained in an off-state (S121).

On the other hand, when the difference is greater than 5 degrees, the battery control unit 24 then determines if the difference between the current battery temperature and the constant value (e.g., 25) is less than a second temperature value, Const2 (S122). An example of the second temperature value is 15 degrees. If the difference is determined to be less than 15 degrees, the battery temperature is determined to be too high (as can be seen in FIG. 8). Thus, the cooling fan in the temperature control system is driven in a first stage (S123).

On the other hand, If the temperature difference is not less than 15 degrees, the battery control unit 24 next determines if the difference between the battery temperature and the constant value (e.g., 25) is less than a third temperature value, Const3 (S124). An example of the third temperature value is 25 degrees. If the difference is determined to be less than 25 degrees (Const3), the cooling fan in the temperature control system is driven in a second stage to reduce the temperature of the battery (S125). If the difference is determined not to be less than 25, the cooling fan is driven in a third stage to reduce the temperature of the battery (S126).

Thus, in this manner, the temperature of the battery for final charging during fast-charging is controlled. Using this method according to a preferred embodiment of the present invention, a battery for an electric vehicle can be charged much faster and much more fully by regulating the battery temperature with the heater and the cooling fan at the initial and the final states of charge. In other words, the battery temperature management method controls the temperature of the battery to maintain a temperature capable of obtaining maximum charge power during the initial state of charge, thereby reducing charge time at the initial charge. The battery temperature management method also maintains a temperature capable of obtaining a maximum charge amount during the final state of charging.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A method for managing temperature of a battery of an electric vehicle, the method comprising:

determining whether a battery charge mode is a fast-charging mode based on state information of the battery;

determining whether a value of a state of charge (SOC) is lower than a predetermined SOC value, when the battery charge mode is the fast-charging mode;

detecting a temperature of the battery and comparing the detected temperature with a reference value for each stage therewith, if the value of SOC is lower than the predetermined SOC value;

regulating the temperature of the battery by controlling power output of a heater in response to a result of comparing the battery temperature with the reference value for each stage;

detecting a temperature of the battery and comparing a difference between the detected temperature of the battery and a predetermined value with a reference temperature for each stage, when the current SOC value is determined to be less than the reference SOC value; and regulating the temperature of the battery by driving a cooling fan in response to a result of comparing the difference between the detected temperature of the battery and the predetermined value with the reference value for each stage at a final state of charging.

2. The method of claim 1, wherein the reference SOC value is set in a range of approximately 80~90%.

3. The method of claim 1, wherein temperature of the battery for beginning to drive a cooling fan of the temperature control system is set at approximately 40 degrees.

4. The method of claim 1, wherein the power output of the heater for increasing the temperature of the battery is increased as the temperature of the battery is decreased.

5. The method of claim 1, wherein the range of the temperature of the battery for adjusting the power output of the heater is set in intervals of approximately 10 degrees.

6. The method of claim 1, wherein the driving strength of the cooling fan according to the temperature of the battery at the final state of charging is adjusted for each stage.

7. The method of claim 1, wherein the range of the temperature of the battery for driving control of the cooling fan at the final state of charging is set in intervals of approximately 10 degrees.

8. The method of claim 1, wherein the adjustment of the driving of the cooling fan and the power output of the heater of the temperature control system is varied according to characteristics of the battery.

9. A method for managing temperature of a battery of a electric vehicle, the method comprising:
   determining whether a value of a state of charge of a battery is less than a predetermined value;
   regulating temperature of the battery such that the temperature of the battery approaches a temperature for a maximum charge power of the battery, if the value of the state of charge of the battery is less than the predetermined value; and
   regulating temperature of the battery such that the temperature of the battery approaches a temperature for a maximum charge amount of the battery, if the value of the state of charge of the battery is greater than the predetermined value.

10. The method of claim 9, wherein, if the value of the state of charge of the battery is less than the predetermined value, said regulating temperature of the battery comprises:
   determining whether the battery temperature is higher than a first predetermined temperature;
   determining whether the battery temperature is higher than a second predetermined temperature, if the battery temperature is higher than the first predetermined temperature; and
   decreasing the battery temperature such that the battery temperature approaches the temperature for the maximum charge power of the battery by cooling the battery, if the battery temperature is higher than the second predetermined temperature.

11. The method of claim 10, wherein, if the value of the state of charge of the battery is less than the predetermined value, said regulating temperature of the battery further comprises:
   increasing the battery temperature such that the battery temperature approaches the temperature for the maximum charge power by heating the battery, if the battery temperature is not higher than the first predetermined temperature.

12. The method of claim 9, wherein, if the value of the state of charge of the battery is greater than the predetermined value, said regulating temperature of the battery comprises:
   determining whether a difference between the battery temperature and a predetermined temperature is less than a predetermined value; and
   decreasing the battery temperature such that the battery temperature approaches the temperature for the maximum charge amount in response to the difference between the battery temperature and the predetermined temperature, if the difference is not less than the predetermined value.

13. A battery temperature management system, comprising:
   a battery temperature control apparatus including a battery heating unit and a battery cooling unit; and
   a battery control unit coupled to the battery temperature control apparatus to control temperature of a battery, the battery control unit being programmed to perform a battery temperature control method comprising:
      determining whether a value of a state of charge of the battery is less than a predetermined value;
      regulating temperature of the battery such that the temperature of the battery approaches a temperature for a maximum charge power of the battery, if the value of the state of charge of the battery is less than the predetermined value; and
      regulating temperature of the battery such that the temperature of the battery approaches a temperature for a maximum charge amount of the battery, if the value of the state of charge of the battery is greater than the predetermined value.

14. The battery temperature management system of claim 13, wherein, if the value of the state of charge of the battery is less than the predetermined value, said regulating temperature of the battery comprises:
   determining whether the battery temperature is higher than a first predetermined temperature;
   determining whether the battery temperature is higher than a second predetermined temperature, if the battery temperature is higher than the first predetermined temperature; and
   decreasing the battery temperature such that the battery temperature approaches the temperature for the maximum charge power of the battery by cooling the battery, if the battery temperature is higher than the second predetermined temperature.

15. The battery temperature management system of claim 14, wherein, if the value of the state of charge of the battery is less than the predetermined value, said regulating temperature of the battery comprises:
   increasing the battery temperature such that the battery temperature approaches the temperature for the maximum charge power by heating the battery.

16. The battery temperature management system of claim 13, wherein, if the value of the state of charge of the battery is greater than the predetermined value, said regulating temperature of the battery comprises:
   determining whether a difference between the battery temperature and a predetermined temperature is less than a predetermined value; and
   decreasing the battery temperature such that the battery temperature approaches the temperature for the maximum charge amount in response to the difference between the battery temperature and the predetermined temperature, if the difference is not less than the predetermined value.

17. A method for managing temperature of a battery of an electric vehicle, the method comprising:
   determining whether a value of a state of charge (SOC) is lower than a predetermined SOC value;
   detecting a temperature of the battery;
   when the value of the SOC is lower than the predetermined SOC value:
      comparing the detected temperature with a plurality of reference values, each reference value corresponding to a boundary of a plurality of battery temperature states, each battery temperature state corresponding to a stage of a battery heater;
      regulating the temperature of the battery by controlling the battery heater in accordance with the stage of the battery heater corresponding to a result of comparing the detected temperature of the battery with the reference value;
   when the value of the SOC is greater than the predetermined SOC value:
      comparing a difference between the detected temperature of the battery and a predetermined value with a plurality of reference temperatures, each reference temperature corresponding to a boundary of a plurality of battery temperature states, each battery temperature state corresponding to a stage of a battery cooling fan; and regulating the temperature of the battery by driving the cooling fan in accordance with the stage of the cooling fan corresponding to a result of comparing the difference between the detected temperature of the battery and the predetermined value with the reference value.

\* \* \* \* \*